United States Patent
Masuda et al.

(10) Patent No.: US 7,574,730 B1
(45) Date of Patent: Aug. 11, 2009

(54) DEVICE AND SYSTEM FOR REDUCING CONFLUENCE NOISE

(75) Inventors: Shigefumi Masuda, Kawasaki (JP); Minoru Ishida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1017 days.

(21) Appl. No.: 09/589,142

(22) Filed: Jun. 7, 2000

(30) Foreign Application Priority Data

Jun. 7, 1999 (JP) ................................. 11-159439

(51) Int. Cl.
*H04N 7/173* (2006.01)

(52) U.S. Cl. ...................... 725/124; 725/119; 725/125; 725/129; 379/338; 379/388.07

(58) Field of Classification Search ......... 725/105–134, 725/98, 99, 148, 149; 379/338–349, 388.07–416
See application file for complete search history.

(56) References Cited

U.S. PATENT DOCUMENTS

| | | | | |
|---|---|---|---|---|
| 3,750,022 A * | 7/1973 | Curry et al. | ................. | 725/125 |
| 3,846,703 A * | 11/1974 | Stewart et al. | ............. | 455/3.03 |
| 5,287,351 A * | 2/1994 | Wall, Jr. | ..................... | 370/206 |
| 5,606,725 A * | 2/1997 | Hart | ............................ | 725/131 |
| 5,745,836 A * | 4/1998 | Williams | .................... | 725/125 |
| 5,761,197 A * | 6/1998 | Takefman | ................... | 370/337 |
| 5,814,737 A * | 9/1998 | Brown | ..................... | 73/861.28 |
| 5,815,794 A * | 9/1998 | Williams | .................... | 725/125 |
| 5,828,946 A * | 10/1998 | Feisullin et al. | ............. | 725/106 |
| 5,867,764 A * | 2/1999 | Williams | .................... | 725/125 |
| 5,870,513 A * | 2/1999 | Williams | .................... | 385/24 |
| 5,881,362 A * | 3/1999 | Eldering et al. | ............. | 725/125 |
| 5,889,765 A * | 3/1999 | Gibbs | ...................... | 370/310.2 |
| 5,987,069 A * | 11/1999 | Furukawa et al. | ........... | 375/285 |
| 6,049,693 A * | 4/2000 | Baran et al. | ................. | 725/124 |
| 6,094,211 A * | 7/2000 | Baran et al. | ................. | 725/125 |
| 6,112,119 A * | 8/2000 | Schuelke et al. | ............... | 607/9 |
| 6,269,106 B1 * | 7/2001 | Wolters et al. | .............. | 370/491 |
| 6,385,773 B1 * | 5/2002 | Schwartzman et al. | ...... | 725/124 |
| 6,483,870 B1 * | 11/2002 | Locklear et al. | ............. | 375/222 |
| 6,567,987 B1 * | 5/2003 | Farhan et al. | ................ | 725/125 |
| 6,577,414 B1 * | 6/2003 | Feldman et al. | ............. | 725/129 |
| 6,775,840 B1 * | 8/2004 | Naegel et al. | ............... | 725/111 |
| 6,868,552 B1 * | 3/2005 | Masuda et al. | .............. | 725/125 |
| 7,120,123 B1 * | 10/2006 | Quigley et al. | .............. | 370/252 |

* cited by examiner

*Primary Examiner*—Annan Q Shang
(74) *Attorney, Agent, or Firm*—Katten Muchin Rosenman LLP

(57) ABSTRACT

A system for reducing noise in a signal line, through which upward signals and downward signals are transmitted between a center and terminals, includes a noise-reduction device provided between the center and the terminals. The noise-reduction device attenuates the upward signals by an increased amount when a noise increase regarding the upward signals is detected on the signal line. The system further includes a noise-control device, provided at terminals, which boosts a transmission level of the upward signals by an amount compensating for the attenuation of the upward signals by the noise-reduction device.

7 Claims, 14 Drawing Sheets

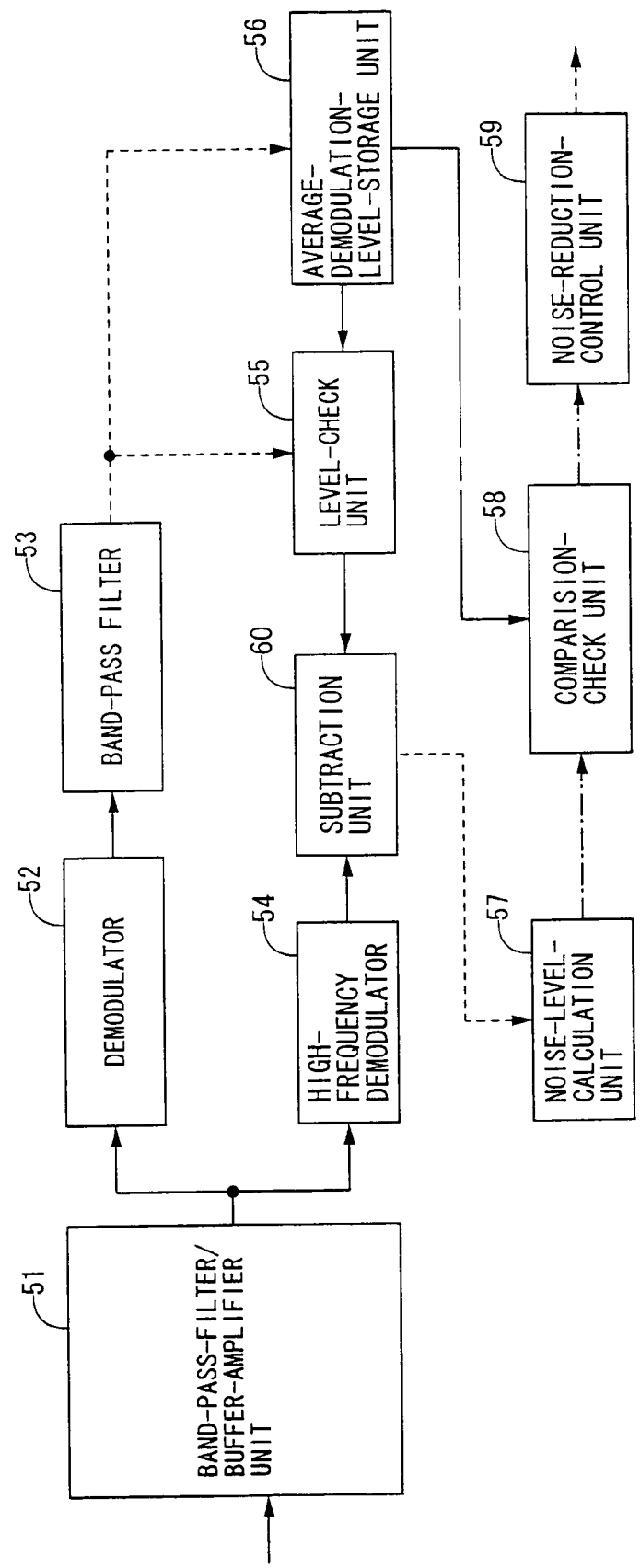
F I G. 5

US 7,574,730 B1

DEVICE AND SYSTEM FOR REDUCING CONFLUENCE NOISE

BACKGROUND OF THE INVENTION

1. Field of the Invention

The present invention relates to a system and a device for reducing confluence noise which are used in a two-way CATV (cable television) system.

2. Description of the Related Art

A two-way CATV system uses a certain frequency band for downward signals directed from a center (headend) to terminals (users), and uses a different frequency band for upward signals directed from terminals to the center. These signals are transmitted through coaxial cables or optical fiber cables to achieve two-way communication. In this configuration, upward signals are mixed with noises as these signals travel to the center. Such noises are called confluence noise, and measures for reducing the confluence noise need to be devised.

FIG. 14 is an illustrative drawing showing a related-art CATV system.

The CATV system of FIG. 14 includes a center 201, a two-way amplifier 202, splitters 203, and terminals 204. The center 201, the two-way amplifier 202, and the splitters 203 are connected via a main transmission line. A plurality of two-way amplifiers 202 are generally provided at predetermined intervals along the main transmission line, thereby amplifying upward and downward signals transmitted through the main transmission line. The splitter 203 may be implemented by using 8 branching configuration. Branch transmission lines connect between the splitters 203 and the terminals 204.

Upward signals from the terminals 204 to the center 201 may be carried through a frequency band with a range between 10 MHz and 55 MHz, and downward signals from the center 201 to the terminals 204 are carried through a frequency band with a range between 70 MHz and 400 MHz. Modulation schemes based on phase modulation such as BPSK, QPSK, and QAM are generally used.

Transmission speed may be 160 kbps, 320 kbps, 640 kbps, and 2560 kbps, or 256 kbps, 1544 kbps, and 3088 kbps. The CATV system as described above may be utilized to implement an on-demand CATV system for supplying moving-picture information in response to user requests, a cable-telephone system for effecting communication between users, a system connected to a switch network to provide Internet services, etc.

Downward signals transmitted from the center 201 to the terminals 204 are split at the splitters 203 to go from the main transmission line to the plurality of branch transmission lines, and travel through the branch transmission lines to reach the terminals 204. Noises mixed with the signals along the branch transmission lines can be a cause of C/N reduction at the terminals 204, but can never cause a significant problem to the system.

On the other hand, upward signals from the terminals 204 to the center 201 merge at the splitters 203 as they go from the branch transmission lines to the main transmission line. Noises that are mixed into the signals at the terminals 204 or along the branch transmission lines cover a wide range of frequencies including the signal frequency band, and are summed at the splitters 203 as they merge, ending up being a cause of a significant C/N reduction. In order to obviate this problem, for example, a scheme is devised to convert upward signals having a frequency band the same as a wireless frequency band into signals having a different frequency band.

When a terminal 204 is disconnected at a time when a user moves out, for example, the branch transmission line ends up having an open end. The open end serves as a noise source by generating reflection noises, so that noises without signals may enter a splitter 203 via the branch transmission line. In other cases, upward signals may include large noises because of malfunction of the terminals 204. In such cases, the terminals 204 act as noise sources. When a plurality of noise sources are present, generated noises are summed at the splitters 203, thereby significantly reducing the C/N of the upward signals. In the worst case, the center 201 cannot detect received signals, resulting in a system shutdown.

Accordingly, there is a need for a scheme which can reduce confluence noise.

SUMMARY OF THE INVENTION

Accordingly, it is a general object of the present invention to provide a scheme which can satisfy the need described above.

It is another and more specific object of the present invention to provide a scheme which can reduce confluence noise.

In order to achieve the above objects according to the present invention; a system for reducing noise in a signal line, through which upward signals and downward signals are transmitted between a center and terminals, includes a noise-reduction device provided between the center and the terminals. The noise-reduction device attenuates the upward signals by an increased amount when a noise increase regarding the upward signals is detected on the signal line. The system further includes a noise-control device, provided at terminals, which boosts a transmission level of the upward signals by an amount compensating for the attenuation of the upward signals by the noise-reduction device.

In the system described above, the upward signals having the boosted transmission level are attenuated by the noise-reduction device to return to their original transmission level. As the upward signals are attenuated, noises are attenuated along with the upward signals, so that a C/N ratio of the upward signals can avoid degradation caused by the noise increase.

Other objects and further features of the present invention will be apparent from the following detailed description when read in conjunction with the accompanying drawings.

BRIEF DESCRIPTION OF THE DRAWINGS

FIG. 5 is a block diagram of a confluence-noise-level-check unit used in a confluence-noise reduction device according to a second embodiment of the present invention;

DESCRIPTION OF THE PREFERRED EMBODIMENTS

In the following, embodiments of the present invention will be described with reference to the accompanying drawings.

Figure 1:
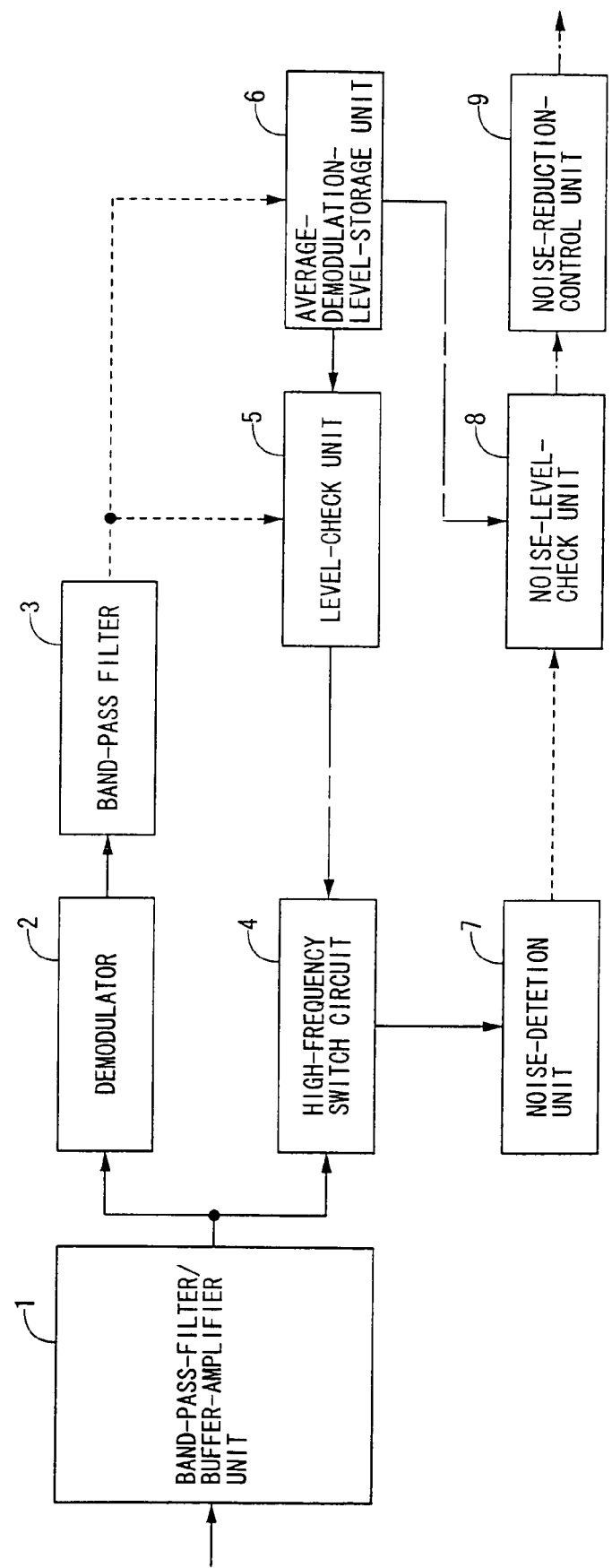
FIG. 1 is a block diagram of a confluence-noise-level-check unit used in a confluence-noise reduction device according to a first embodiment of the present invention.

FIG. 1 is a block diagram of a confluence-noise-level-check unit used in a confluence-noise reduction device according to a first embodiment of the present invention.

The confluence-noise-level-check unit of FIG. 1 includes a band-pass-filter/buffer-amplifier unit 1, a demodulator 2, a band-pass filter 3, a high-frequency switch circuit 4, a level-check unit 5, an average-demodulation-level-storage unit 6, a noise-detection unit 7, a noise-level-check unit 8, and a noise-reduction-control unit 9. In FIG. 1, solid lines indicates flow of high-frequency signals such as upward signals, and dashed lines indicate medium-frequency signals and demodulated output signals. Further, intermittently dashed lines indicate direct-current signals.

A confluence-noise-reduction device is generally situated where splitters or two-way amplifiers are provided along upward-signal transmission lines. The confluence-noise-level-check unit of such a confluence-noise-reduction device detects a situation where a confluence-noise level exceeds a predetermined threshold. The band-pass-filter/buffer-amplifier unit 1 has such frequency characteristics that only the upward signals having a frequency band between 10 MHz and 55 MHz can pass through. The band-pass-filter/buffer-amplifier unit 1 is used for extracting the upward signals being transmitted through the main or branch transmission lines by using a buffer amplifier having a high-input impedance.

The demodulator 2 is configured in accordance with an employed modulation scheme such as BPSK, QPSK, or QAM. For example, the demodulator 2 may reproduce a carrier wave from a received high-frequency signal by using a proper reproduction scheme, and may use the reproduced carrier wave to carry out coherent detection of the received high-frequency signal. Alternatively, the demodulator 2 may delay a received high-frequency signal by one symbol, and may use the delayed signal to perform coherent detection of the received high-frequency signal. In such cases, a preamble obtained as a burst signal exhibits a predetermined pattern. When an output signal obtained through the coherent detection shows this predetermined pattern, therefore, the upward signal may be regarded as a valid upward signal. Here, the demodulator 2 may have a simpler configuration when the configuration based on the delayed signal is employed than when the configuration based on the reproduced carrier wave is employed. Use of such a simpler configuration can economize the system.

The band-pass filter 3 is designed to allow passage of a base-band signal, i.e., passage of a demodulated signal output from the demodulator 2. For example, the band-pass filter 3 may have a pass band between 10 kHz and 10 MHz. In consideration of the fact that upward signals are transmitted as burst signals, the average-demodulation-level-storage unit 6 holds an average level of the base-band signal supplied from the demodulator 2 where the average is obtained over a predetermined time period. Alternatively, the average-demodulation-level-storage unit 6 may hold therein a reference level for a comparison check.

The level-check unit 5 compares a level of the base-band signal supplied from the demodulator 2 with a level held by the average-demodulation-level-storage unit 6. In general, a signal level is greater than a noise level. When the base-band-signal level is close to the average level of the detected signal or exceeds the reference level, a received signal is ascertained as a valid upward signal. In this case, the level-check unit 5 supplies a control signal to the high-frequency switch circuit 4 to switch it off.

When the base-band-signal level is lower than the level of the average-demodulation-level-storage unit 6 by a significant margin, the level-check unit 5 ascertains that the received signal is not a valid upward signal. In this case, the level-check unit 5 supplies a control signal to the high-frequency switch circuit 4 to switch it on. The upward signal from the band-pass-filter/buffer-amplifier unit 1 is thus supplied to the noise-detection unit 7 via the high-frequency switch circuit 4.

The noise-detection unit 7 may be configured to detect an envelop of a noise after converting it into medium-frequency signal. Further, since an upward signal is a burst-like signal, the noise-detection unit 7 can be configured to hold a noise level that is detected during a period when no valid upward signal is transmitted. The noise-level-check unit 8 compares a level of an output of the noise-detection unit 7 with the level or reference level held by the average-demodulation-level-storage unit 6. When the level of the output of the noise-detection unit 7 exceeds the level or reference level of the average-demodulation-level-storage unit 6, the noise-level-check unit 8 ascertains that there is an increase in confluence noise, and supplies a control signal to the noise-reduction-control unit 9.

Since only noises are present during a time period between a burst-like signal and a next burst-like signal, the noise-detection unit 7 can detect a noise level of such noises. The detected noise level is compared with the signal level or a predetermined level. If the noise level is greater in comparison, it is ascertained that the level of confluence noise has increased. Here, the output level of the noise-detection unit 7 can be compared with the reference level. In consideration of possible changes in transmission conditions, however, use of the level of a detected signal or an average thereof may be preferred over use of the fixed reference level since such a detected signal follows the changes of the transmission conditions. This can improve accuracy of the noise detection. Further, a ratio of comparison may be set in the noise-level-check unit 8 in advance.

Based on a result of the check made by the noise-level-check unit 8, the noise-reduction-control unit 9 may supply an alarm signal, or may activate a noise-reduction unit, which will be described later.

In the configuration described above, the level-check unit 5, the average-demodulation-level-storage unit 6, the noise-level-check unit 8, and the noise-reduction-control unit 9 may be implemented by using digital circuits. Alternatively, functions of these units may be implemented via a processor performing equivalent functions.

The control signal from the noise-reduction-control unit 9 prompts the confluence-noise-reduction unit to increase attenuation of a variable attenuation unit. The upward signals from terminal devices are amplified in commensurate with the amount of attenuation while avoiding amplification of noises. In this manner, a C/N reduction caused by an increase in confluence noise can be avoided.

Figure 2:
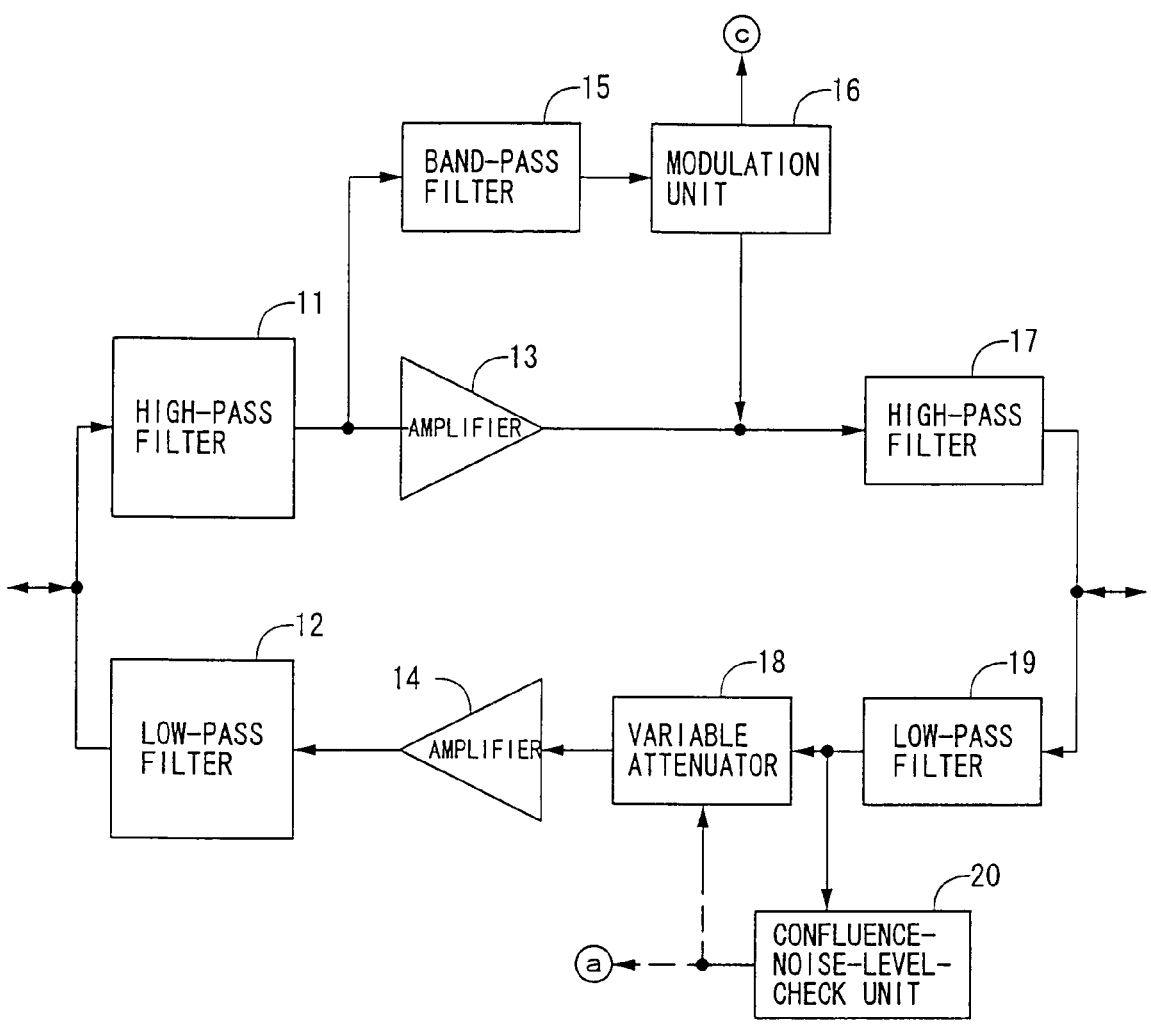
FIG. 2 is a block diagram of a confluence-noise-reduction unit used in the confluence-noise-reduction device according to the first embodiment of the present invention.

FIG. 2 is a block diagram of the confluence-noise-reduction unit used in the confluence-noise-reduction device according to the first embodiment of the present invention.

The confluence-noise-reduction unit of FIG. 2 includes a high-pass filter 11, a low-pass filter, an amplifier 13, an amplifier 14, a band-pass filter 15, a modulation unit 16, a high-pass filter 17, a variable attenuator 18, a low-pass filter 19, and a confluence-noise-level-check unit 20. The high-pass filter 11 receives downward signals passing therethrough. The low-pass filter 12 receives upward signals passing therethrough. The high-pass filter 17 allows passage of the downward signals, and the low-pass filter 19 allows passage of the upward signals. In FIG. 2, solid lines indicate high-frequency signals, and intermittently dashed lines indicate direct-current control signals. The configuration of FIG. 1 is combined with the configuration of FIG. 2 to make up the confluence-noise-reduction device.

Downward signals from the center to the terminals travel through the high-pass filter 11, the amplifier 13, and the high-pass filter 17 before they reach the terminals. As this happens, the band-pass filter 15 extracts a pilot signal. In response to the control signal supplied from the confluence-noise-level-check unit 20, the modulation unit 16 modulates a tone signal, and inserts the tone signal into the pilot signal before transmitting the pilot signal.

Upward signals are transmitted to the center via the low-pass filter 19, the variable attenuator 18, the amplifier 14, and the low-pass filter 12. The variable attenuator 18 can be implemented by using a known structure, and is used for controlling attenuation of the upward signals.

The confluence-noise-level-check unit 20 has the same structure as that shown in FIG. 1. The control signal supplied from the noise-reduction-control unit 9 as a result of the noise-level check is supplied to the variable attenuator 18 and the modulation unit 16. When there is an increase in confluence noise, the control signal from the confluence-noise-level-check unit 20 prompts the modulation unit 16 to modulate the tone signal and insert it into a downward signal. The tone signal makes amplifiers increase gains thereof where the amplifiers are situated at cable modems or the like in the terminals. As a result of the gain increases, transmission levels of upward signals are boosted. At the same time, attenuation of the variable attenuator 18 is controlled to attend to stronger attenuation of the upward signals having the boosted transmission levels.

As previously described, upward signals merge at the splitters, and noises are summed together as they come from noise sources such as an open end of a branch transmission line. This results in a rise in a confluence noise level. In the present invention, however, the terminals step up the transmission levels of upward signals when receiving the tone signal, and the variable attenuator 18 attenuates the upward signals having the stepped up transmission levels. This effectively reduces a relative noise level, thereby avoiding a C/N reduction caused by confluence noise.

Figure 3:
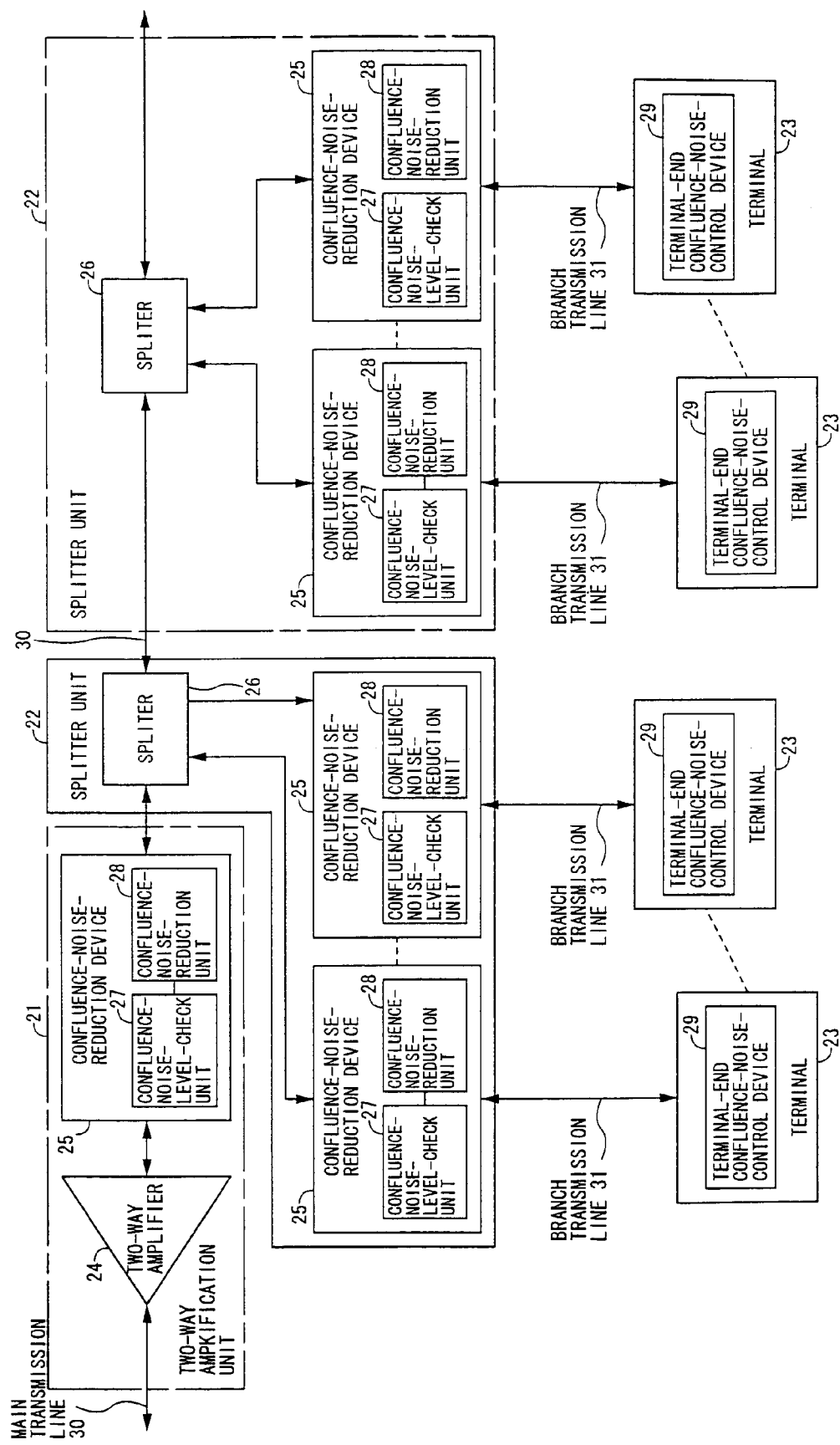
FIG. 3 is an illustrative drawing showing an embodiment of a confluence-noise-reduction system according to the present invention.

FIG. 3 is an illustrative drawing showing an embodiment of a confluence-noise-reduction system according to the present invention.

The system of FIG. 3 includes a two-way amplification unit 21, splitter units 22, and terminals 23. The two-way amplification unit 21 includes a two-way amplifier 24 and a confluence-noise-reduction device 25. The splitter units 22 includes confluence-noise-reduction devices 25 and a splitter 26. Here, each of the confluence-noise-reduction devices 25 includes a confluence-noise-level-check unit 27 and a confluence-noise-reduction unit 28. Each of the terminals 23 includes a terminal-end confluence-noise-control device 29. Further, the system of FIG. 3 includes a main transmission line 30 and branch transmission lines 31.

The confluence-noise-reduction device 25 may be provided in at least one of the two-way amplification unit 21 and the splitter units 22, which are situated at predetermined intervals along the main transmission line 30. In FIG. 3, one confluence-noise-reduction device 25 is provided for each of the terminals 23. Instead of such a configuration, it is acceptable to provide one confluence-noise-reduction device 25 for a plurality of terminals. The confluence-noise-level-check unit 27 and the confluence-noise-reduction unit 28 of the confluence-noise-reduction device 25 have the configurations of FIG. 1 and FIG. 2, respectively. The terminal-end confluence-noise-control device 29 detects a tone signal inserted into downward signals, and controls a gain of a variable-gain amplifier.

When an open end is created on a branch transmission line 31 after a terminal 23 is removed, the open end will act as a noise source. A confluence-noise-reduction device 25 that is connected to this branch transmission line 31 detects an increase in a confluence noise level by use of the confluence-noise-level-check unit 27. The confluence-noise-reduction device 25 strengthens attenuation of a variable attenuator included in the confluence-noise-reduction unit 28, and transits a tone signal to terminals 23.

In the case of the confluence-noise-reduction device 25 that is provided in the two-way amplification unit 21 on the main transmission line 30, finding of the increase in confluence noise prompts the confluence-noise-reduction unit 28 to increase attenuation of a variable attenuator and insert a tone signal into a downward signal. The terminals 23 that are connected to the splitters 26 via the branch transmission lines 31 detect the tone signals inserted into the downward signals, and boost gains of variable amplifiers.

In a case where the confluence-noise-reduction device 25 is provided in each of the two-way amplification unit 21 and the splitter units 22, the terminal-end confluence-noise-control device 29 of the terminals 23 detects the tone signals indicating the increase of confluence noise, and steps up a gain of the variable amplifier by 25 dB, for example, to amplify upward signals. The amplified upward signals are transmitted via the branch transmission lines 31. Noise from the noise source created after the removal of the terminal 23 is not amplified because no terminal-end confluence-noise-control device 29 is provided at this noise source.

The variable attenuator of the confluence-noise-reduction unit 28 provided in the pertinent splitter unit 22 attenuates the upward signals by 15 dB. Further, the variable attenuator of the confluence-noise-reduction unit 28 provided in the two-way amplification unit 21 attenuates the upward signals by 10 dB. As a result, the upward signals are supplied to the center as signals having a predetermined signal level. Since the confluence noise is attenuated by 25 dB in total, a C/N reduction is avoided, thereby making it possible to provide a continuing service of two-way communication.

In this manner, when a terminal 23 is taken off from a branch transmission line 31 to make an open end, a noise level exhibits an increase at a confluence point of upward signals. Such an increase is detected by the confluence-noise-level-check unit 27 of the confluence-noise-reduction device 25 provided in the two-way amplification unit 21, for example, resulting in transmission of a tone signal. When detecting the tone signal, the terminals 23 boost gains of the variable amplifiers thereof to step up a transmission level of upward signals. While the upward signals are boosted, noise generated by the open-end noise source is not amplified. Such noise merely merge with the upward signals. Then, the upward signals are attenuated to bring the boosted transmission level down to the original signal level, bringing down the noise level together. This is the mechanism of how a C/N reduction can be avoided even when the confluence noise is increased.

The gain increase of the variable amplifier by the terminal-end confluence-noise-control device 29 is basically selected such as to compensate for the increase of attenuation of the variable attenuator 18. It is conceivable, however, to select the gain increase such as to compensate for various losses such as losses incurred at splitters and losses of the transmission lines in addition to compensating for the attenuation increase. In consideration of this, it is preferable to select a possibly different gain for different terminals when the tone signal is detected.

Figure 4:
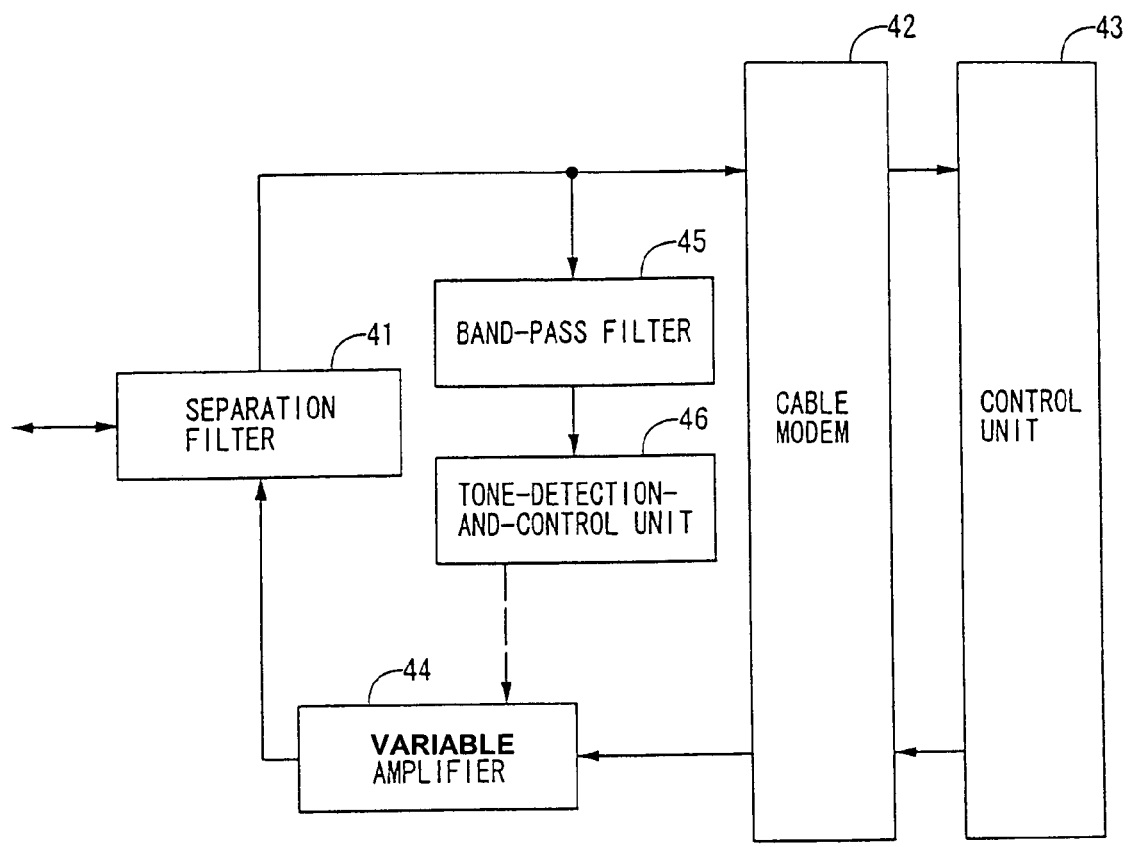
FIG. 4 is a block diagram of a relevant part of a terminal used in the confluence-noise-reduction system according to the present invention.

FIG. 4 is a block diagram of a relevant part of a terminal used in the confluence-noise-reduction system according to the present invention.

The configuration of FIG. 4 includes a separation filter 41, a cable modem 42, a control unit 43, a variable amplifier 44, a band-pass filter 45, and a tone-detection-and-control unit 46. The control unit 43 includes a display, a keyboard, etc. The variable amplifier 44, the band-pass filter 45, and the tone-detection-and-control unit 46 together make up the terminal-end confluence-noise-control device 29 of FIG. 3.

The separation filter 41 connected to a branch transmission line separates a downward signal, and supplies it to the cable modem 42. Further, the separation filter 41 sends an upward signal to the branch transmission line when the upward signal modulated by the cable modem 42 is supplied via the variable amplifier 44. As previously described, when the confluence-noise-level-check unit 27 of the confluence-noise-reduction device 25 (FIG. 3) transmits a tone signal indicative of an increase of confluence noise, the band-pass filter 45 extracts this tone signal. The tone-detection-and-control unit 46 then detects the extracted tone signal, and controls the variable amplifier 44 to increase its gain. In this manner, an upward signal having a boosted transmission level is transmitted to the center.

The tone signal may prompt the gain increase of the variable amplifier 44 during a whole period while the tone signal is being transmitted. Alternatively, the tone signal may be transmitted only at such a timing as a gain is to be changed. Alternatively, two types of tone signals may be transmitted in order to switch between a state of an increased gain and a state of a normal gain. Further, use of frequency information, on/off patterns, code information, etc., of the tone signal makes it possible to convey position information. Moreover, it is possible to include information about a signal level associated with a check of an increase in confluence noise.

FIG. 5 is a block diagram of a confluence-noise-level-check unit used in a confluence-noise reduction device according to a second embodiment of the present invention.

The confluence-noise-level-check unit of FIG. 5 includes a band-pass-filter/buffer-amplifier unit 51, a demodulator 52, a band-pass filter 53, a high-frequency demodulator 54, a level-check unit 55, an average-demodulation-level-storage unit 56, a noise-level-calculation unit 57, a comparison-check unit 58, a noise-reduction-control unit 59, and a subtraction unit 60. In FIG. 5, solid lines indicates flow of high-frequency signals such as upward signals, and dashed lines indicate medium-frequency signals and demodulated output signals. Further, intermittently dashed lines indicate direct-current signals.

The band-pass-filter/buffer-amplifier unit 51 extracts part of an upward signal, and the demodulator 52 demodulates the extracted upward signal. The band-pass filter 53 supplies a base-band signal to the level-check unit 55 and the average-demodulation-level-storage unit 56. In the same manner as the demodulator 2 of FIG. 1, the demodulator 52 may attend to coherent detection based on either a reproduced carrier wave or a delayed signal.

The average-demodulation-level-storage unit 56 may obtain an average over a predetermined time period of a base-band signal supplied from the band-pass filter 53, and may hold the obtained average level. Alternatively, the average-demodulation-level-storage unit 56 may keep therein a fixed reference level to be used for comparison. The level-check unit 55 compares the base-band-signal level supplied from the band-pass filter 53 with the level of the average-demodulation-level-storage unit 56, and ascertains that a signal is a valid upward signal if the compared levels are close to each other.

The high-frequency demodulator 54 demodulates a high-frequency signal supplied from the band-pass-filter/buffer-amplifier unit 51. A demodulated output of the high-frequency demodulator 54 includes a signal component and a noise component, and is supplied to the subtraction unit 60. The subtraction unit 60 obtains a difference between the base-band-signal level from the level-check unit 55 and the level of the demodulated output supplied from the high-frequency demodulator 54. The obtained difference corresponds to a noise level. The noise-level-calculation unit 57 derives a noise level from the level difference provided from the subtraction unit 60.

The comparison-check unit 58 compares the noise level of the noise-level-calculation unit 57 with the level of the average-demodulation-level-storage unit 56. The comparison-check unit 58 ascertains that there is an increase in confluence noise if the noise level is greater in comparison. In this case, the comparison-check unit 58 supplies a control signal to the noise-reduction-control unit 59. In response, the noise-reduction-control unit 59 attenuates upward signals by use of a variable attenuator of a confluence-noise-reduction unit, and attends to the control of a transmission level of terminals. This portion is basically the same as the operation of the first embodiment.

Figure 6:
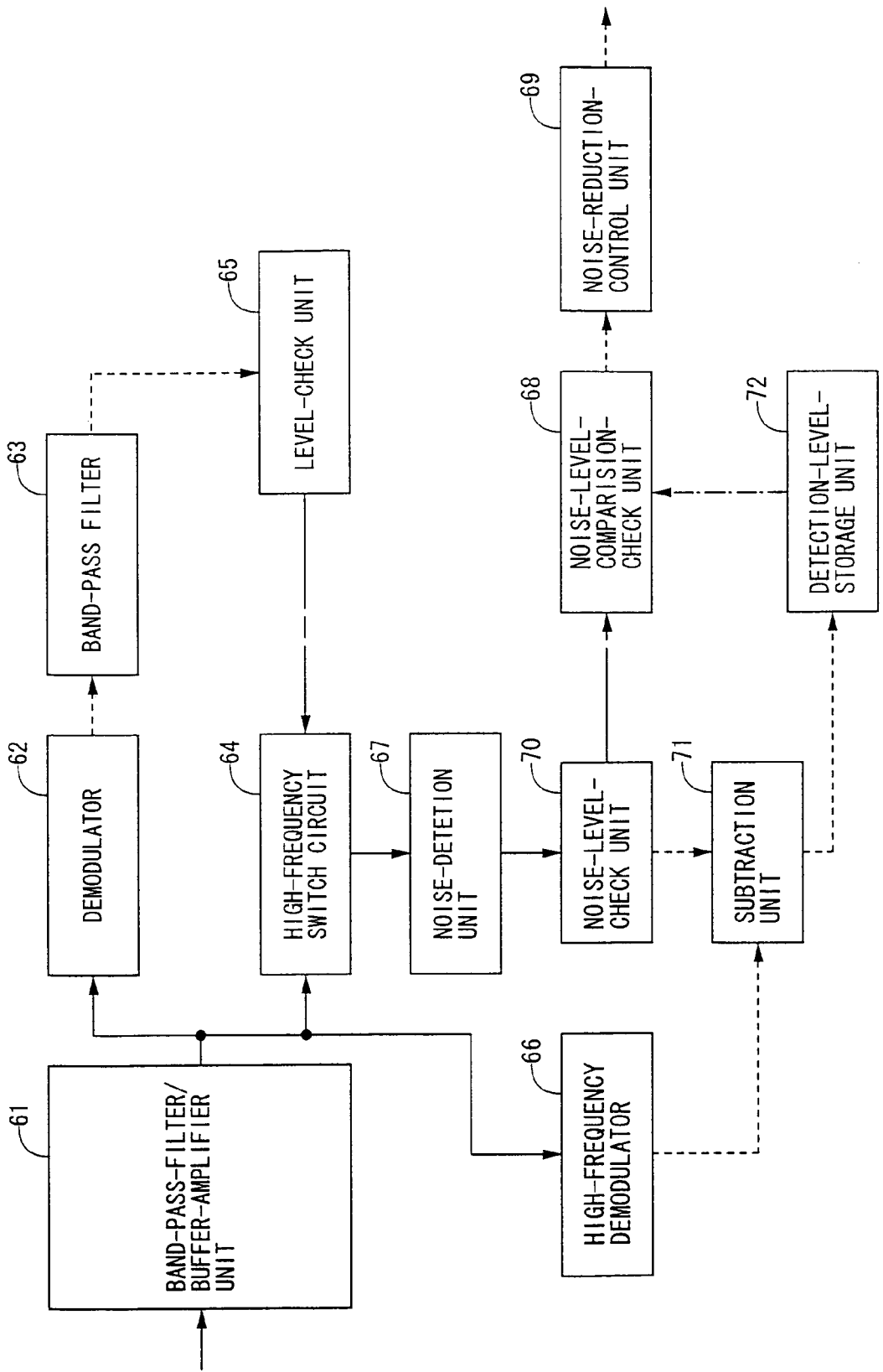
FIG. 6 is a block diagram of a confluence-noise-level-check unit used in a confluence-noise reduction device according to a third embodiment of the present invention.

FIG. 6 is a block diagram of a confluence-noise-level-check unit used in a confluence-noise reduction device according to a third embodiment of the present invention.

The confluence-noise-level-check unit of FIG. 6 includes a band-pass-filter/buffer-amplifier unit 61, a demodulator 62, a band-pass filter 63, a high-frequency switch circuit 64, a level-check unit 65, a high-frequency demodulator 66, a noise-detection unit 67, a noise-level-comparison-check unit 68, a noise-reduction-control unit 69, a noise-level-check unit 70, a subtraction unit 71, and a detection-level-storage unit 72. In FIG. 6, solid lines indicates flow of high-frequency signals such as upward signals, and dashed lines indicate medium-frequency signals and demodulated output signals. Further, intermittently dashed lines indicate direct-current signals.

The band-pass-filter/buffer-amplifier unit 61, the demodulator 62, the band-pass filter 63, the high-frequency switch circuit 64, the level-check unit 65, and the noise-detection unit 67 have the same configurations and operations as those of corresponding elements shown in FIG. 1. The noise-detection unit 67 receives a high-frequency signal from the band-pass-filter/buffer-amplifier unit 61 via the high-frequency switch circuit 64 when the high-frequency switch circuit 64 is switched on in response to a situation where noises are present with no valid upward signals. The noise-detection unit 67 attends to high-frequency detection of noise components that are observed during a period of no signal transmission. The high-frequency demodulator 66 attends to high-frequency detection at all the time regardless of whether there are signal components or noise components.

The noise-level-check unit 70 supplies an output of the noise-detection unit 67 to the subtraction unit 71, and supplies a noise-level signal to the noise-level-comparison-check unit 68 where the noise-level signal is indicative of a checked noise level. The subtraction unit 71 obtains a difference between the output signal level of the high-frequency demodulator 66 and the output noise level of the noise-detection unit 67 supplied from the noise-level-check unit 70. An obtained difference corresponds to a received signal level less a noise level, thereby representing a level of a signal component. This is regarded as a detected signal level, which is then held by the detection-level-storage unit 72. The detected signal level held by the detection-level-storage unit 72 is supplied to the noise-level-comparison-check unit 68.

The noise-level-comparison-check unit 68 compares the noise level of the noise-level-check unit 70 with the detected signal level of the detection-level-storage unit 72. When the noise level is greater in comparison, the noise-level-comparison-check unit 68 ascertains that there is an increase in confluence noise, and supplies a control signal to the noise-reduction-control unit 69. The noise-reduction-control unit 69 attends to the same control as in the previous embodiments.

Figure 7:
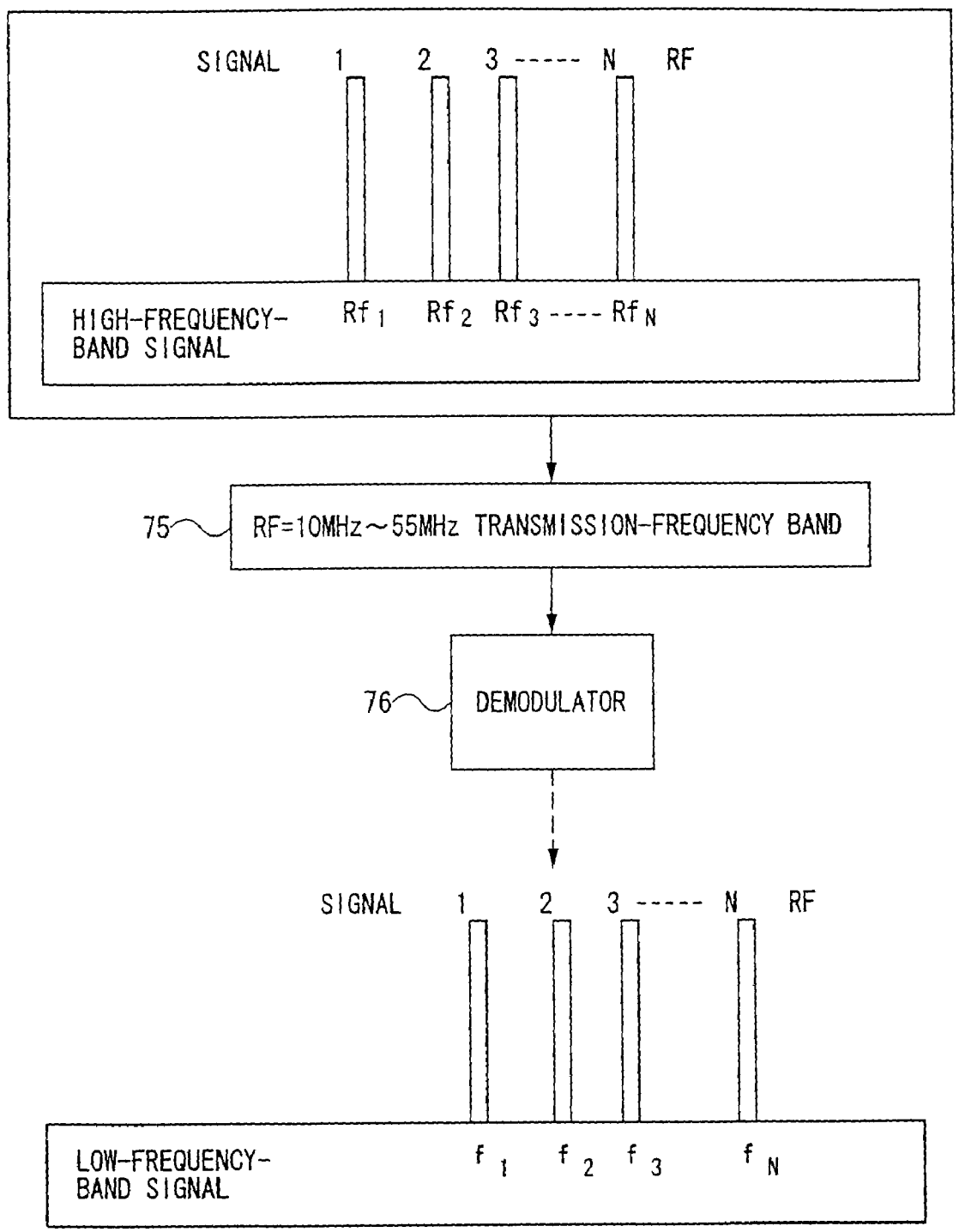
FIG. 7 is an illustrative drawing for explaining a level-check operation of the present invention.

FIG. 7 is an illustrative drawing for explaining the level-check operation of the present invention. What is shown in FIG. 7 corresponds to the operations of the level-check units 5, 55, and 65 shown in FIGS. 1, 5, and 6, respectively.

High-frequency-band signals $Rf_1$ through $Rf_N$ are transmitted as upward signals by using a frequency band ranging from 10 MHz to 55 MHz. In FIG. 7, the band-pass-filter/buffer-amplifier unit 1, 51, or 61 is shown as a filter 75. The filter 75 may have a frequency characteristic allowing passage of high-frequency-band signals $Rf_1$ through $Rf_N$, or have a pass-band ranging from 10 MHz to 55 MHz. Alternatively, the filter 75 may have a high-pass-filter characteristic that allows passage of frequencies higher than or equal to $Rf_1$, or may have a low-pass-filter characteristic that allows passage of frequencies lower than or equal to $Rf_N$. Alternatively, the filter 75 may have a frequency characteristic that allows passage of some of the high-frequency-band signals $Rf_1$ through $Rf_N$. Where only one terminal is connected to the confluence-noise-reduction device and only one frequency is used, the filter 75 may have a frequency characteristic that allows passage of that particular frequency.

The demodulator 2, 52, or 62 is shown as a demodulator 76 in FIG. 7. Low-frequency-band signals $f_1$ through $f_N$ are supplied from the demodulator 76 via the band-pass filter 3, 53, or 63. A check is made on a level of the low-frequency-band signals $f_1$ through $f_N$. The low-frequency-band signals $f_1$ through $f_N$ may have a frequency range between 10 kHz and 10 MHz. Depending on the frequency characteristic of the filter 75, only some of the low-frequency-band signals $f_1$ through $f_N$ may be included.

For the sake of simplicity, in FIG. 7, the low-frequency-band signals $f_1$ through $f_N$ are shown as having the same signal level. In reality, however, each signal has a different signal level generally because of a difference in transmission-line losses or the like. When amplification control is put in place such as to control a signal level of each frequency band at the same signal level, however, the low-frequency-band signals $f_1$ through $f_N$ will have the same signal level as shown in FIG. 7. Each signal is transmitted as a burst signal. In the configuration of FIG. 1 or FIG. 5, therefore, the average-demodulation-level-storage unit 6 or 56 obtains an average over a predetermined time period, and holds the obtained average. Since upward signals are burst signals, at least one of the noise level or the signal level is stored and used in a level comparison where the noise level and the signal level are detected during different time period.

Figure 8:
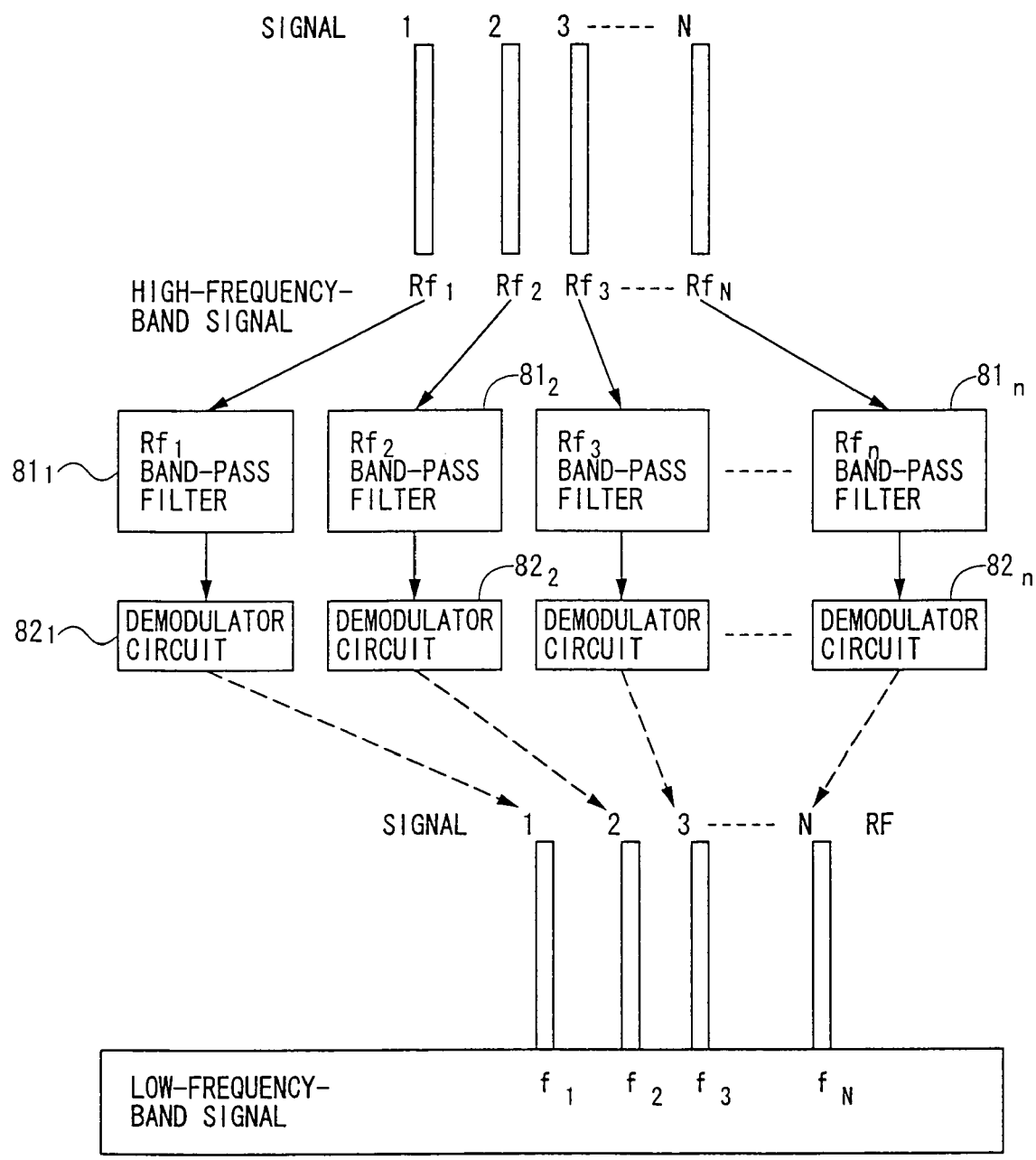
FIG. 8 is an illustrative drawing for explaining the level-check operation of the present invention.

FIG. 8 is an illustrative drawing for explaining the level-check operation of the present invention. FIG. 8 shows an operation more complex than that shown in FIG. 7. The operation of FIG. 8 can provide more accurate level detection.

In FIG. 8, band-pass filters $81_1$ through $81_N$ are provided with respect to the high-frequency-band signals $Rf_1$ through $Rf_N$, respectively. The band-pass filters $81_1$ through $81_N$ correspond to the band-pass-filter/buffer-amplifier unit 1, 51, or 61. Further, the demodulator 2, 52, or 62 corresponds to a set of demodulator circuits $82_1$ through $82_N$, which are provided to correspond to the high-frequency-band signals $Rf_1$ through $Rf_N$, respectively. Demodulated signals output from the demodulator circuits $82_1$ through $82_N$ ultimately become the low-frequency-band signals $f_1$ through $f_N$, respectively, which are subjected to a level comparison.

Figure 9:
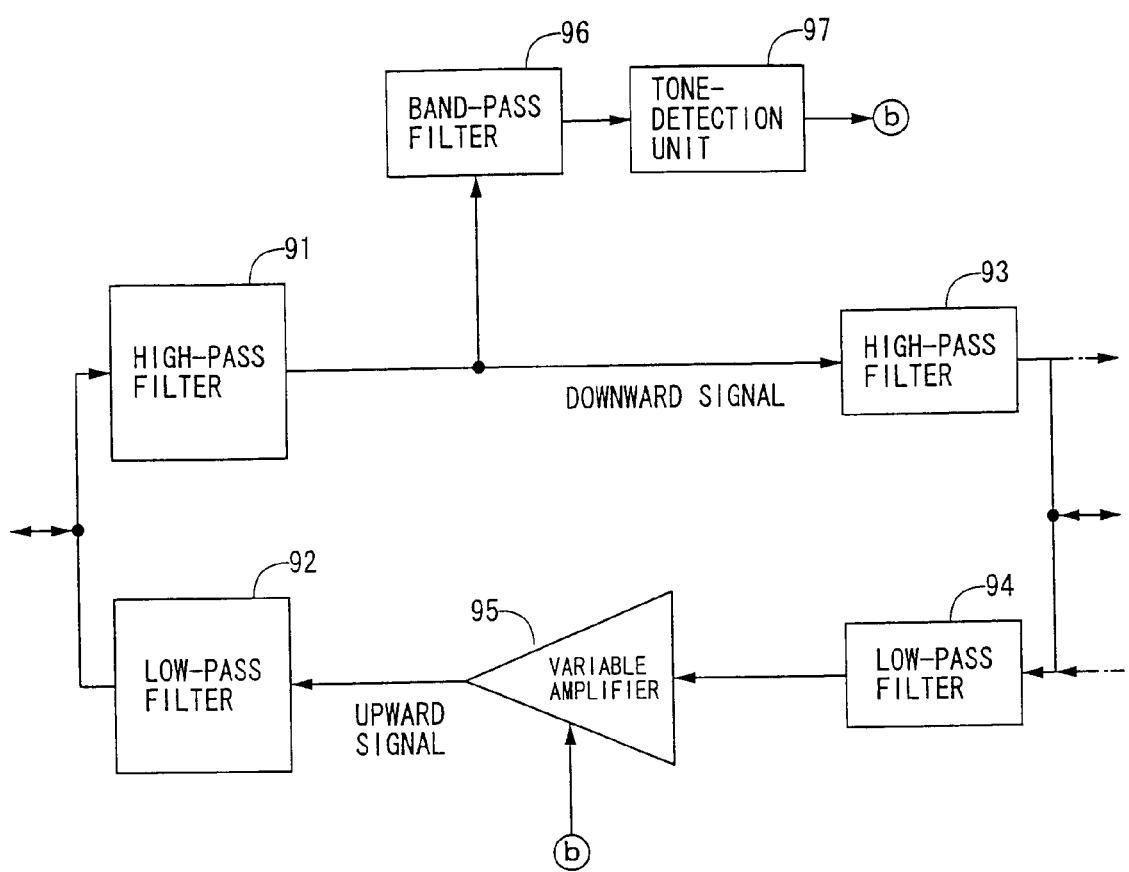
FIG. 9 is an illustrative drawing for explaining an operation of controlling upward signals according to the present invention.

FIG. 9 is an illustrative drawing for explaining the operation of controlling upward signals according to the present invention. FIG. 9 shows a relevant portion of the terminal-end confluence-noise-reduction device.

A configuration of FIG. 9 includes a high-pass filter 91, a low-pass filter 92, a high-pass filter 93, a low-pass filter 94, a variable amplifier 95, a band-pass filter 96, and a tone-detection unit 97. The high-pass filters 91 and 93 allow downward signals to pass therethrough, and the low-pass filters 92 and 94 allow upward signals to pass therethrough. The band-pass filter 96 and the tone-detection unit 97 together make up a tone-signal-detection mechanism.

A downward signal transmitted through a branch-transmission line passes through the high-pass filter 91, and the band-pass filter 96 extracts a pilot signal or the like that includes a tone signal. The tone signal is one that was modulated by the modulator of FIG. 2, and is detected by the tone-detection unit 97. In response to the detection of the tone signal that is transmitted in response to an increase in confluence noise, the tone-detection unit 97 increases a gain of the variable amplifier 95 so as to boost a transmission level of upward signals.

The upward signals from a terminal to the center are supplied from a cable modem to the variable amplifier 95 via the low-pass filter 94, and, then, are sent to the center via the low-pass filter 92. During a normal operation, the gain of the variable amplifier 95 may be set to 1. When confluence noise is increased to result in the tone signal being inserted into a downward signal, the tone-detection unit 97 detects the tone signal, and boosts the gain of the variable amplifier 95. A C/N ratio of the upward signals are improved in this manner when the upward signals are transmitted to the center. As previously described, a variable attenuator of a confluence-noise-reduction unit attenuates the upward signals by an amount commensurate with the gain increase of the variable amplifier 95, thereby transmitting the upward signal to the center as signals having a predetermined signal level. As the upward signals are attenuated, noises are also attenuated, thereby avoiding a reduction of the C/N ratio.

In the configuration of FIG. 9, the high-pass filter 91 separates downward signals, so that the high-pass filter 93 may be omitted from a path that supplies the downward signals to a cable modem. Further, Since the upward signals from the cable modem pass through the low-pass filter 94, the low-pass filter 92 may be omitted from a path that transmits the upward signals to a branch transmission line.

Figure 10:
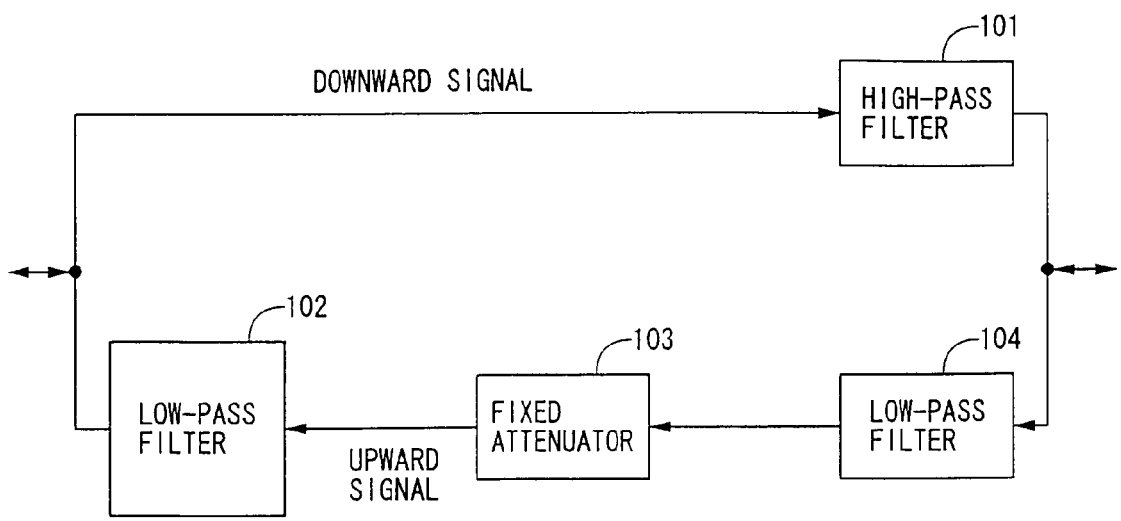
FIG. 10 is a block diagram of an upward-signal-attenuation unit used in a confluence-noise-reduction system according to another embodiment of the present invention.
Figure 11:
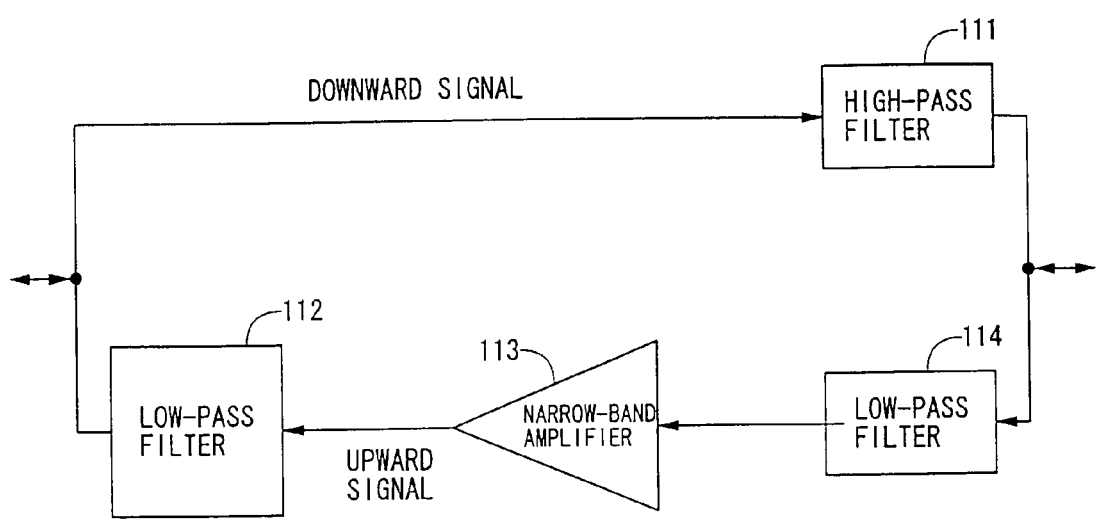
FIG. 11 is a block diagram of an upward-signal-amplification unit used in a confluence-noise-reduction system in combination with the unit of FIG. 10.

FIG. 10 is a block diagram of an upward-signal-attenuation unit used in a confluence-noise-reduction system according to another embodiment of the present invention. What is shown in FIG. 10 corresponds to a confluence-noise-reduction unit. FIG. 11 is a block diagram of an upward-signal-amplification unit used in a confluence-noise-reduction system in combination with the unit of FIG. 10. What is shown in FIG. 11 corresponds to a terminal-end confluence-noise-control device.

A configuration of FIG. 10 includes a high-pass filter 101, a low-pass filter 102, a fixed attenuator 103, and a low-pass filter 104. Downward signals pass through the high-pass filter 101, and upward signals pass through the low-pass filter 102, the fixed attenuator 103, and the low-pass filter 104. A configuration of FIG. 11 includes a high-pass filter 111, a low-pass filter 112, a narrow-band amplifier 113, and a low-pass filter 114. Downward signals pass through the high-pass filter 111, and upward signals pass through the low-pass filter 112, the narrow-band amplifier 113, and the low-pass filter 114.

The fixed attenuator 103 may be provided in each of the two-way amplification unit 21 and the splitter units 22 shown in FIG. 3. The fixed attenuator 103 provided in the two-way amplification unit 21 may be set to an attenuation of 10 dB, and the fixed attenuator 103 provided in the splitter units 22 may be set to an attenuation of 15 dB. The narrow-band amplifier 113 provided in a terminal is controlled so as to boost upward signals by 25 dB. As a result, the upward signals having a level thereof boosted by 25 dB are transmitted from the terminal to a branch-transmission line, and are attenuated by 15 dB in the splitter unit with an additional attenuation of 10 dB being introduced in the two-way amplification unit.

In this embodiment, attenuation is fixed in advance by use of the fixed attenuator 103, and a gain increase is introduced only within a frequency band selected in advance by use of the narrow-band amplifier 113. Such a configuration is flexible in that the attenuation and gains are selected by taking into account losses at various portions of the system. While the upward signals are attenuated after amplification so as to return to an original signal level, noises are attenuated by 25 dB, for example, thereby avoiding a reduction in the C/N ratio.

Figure 12:
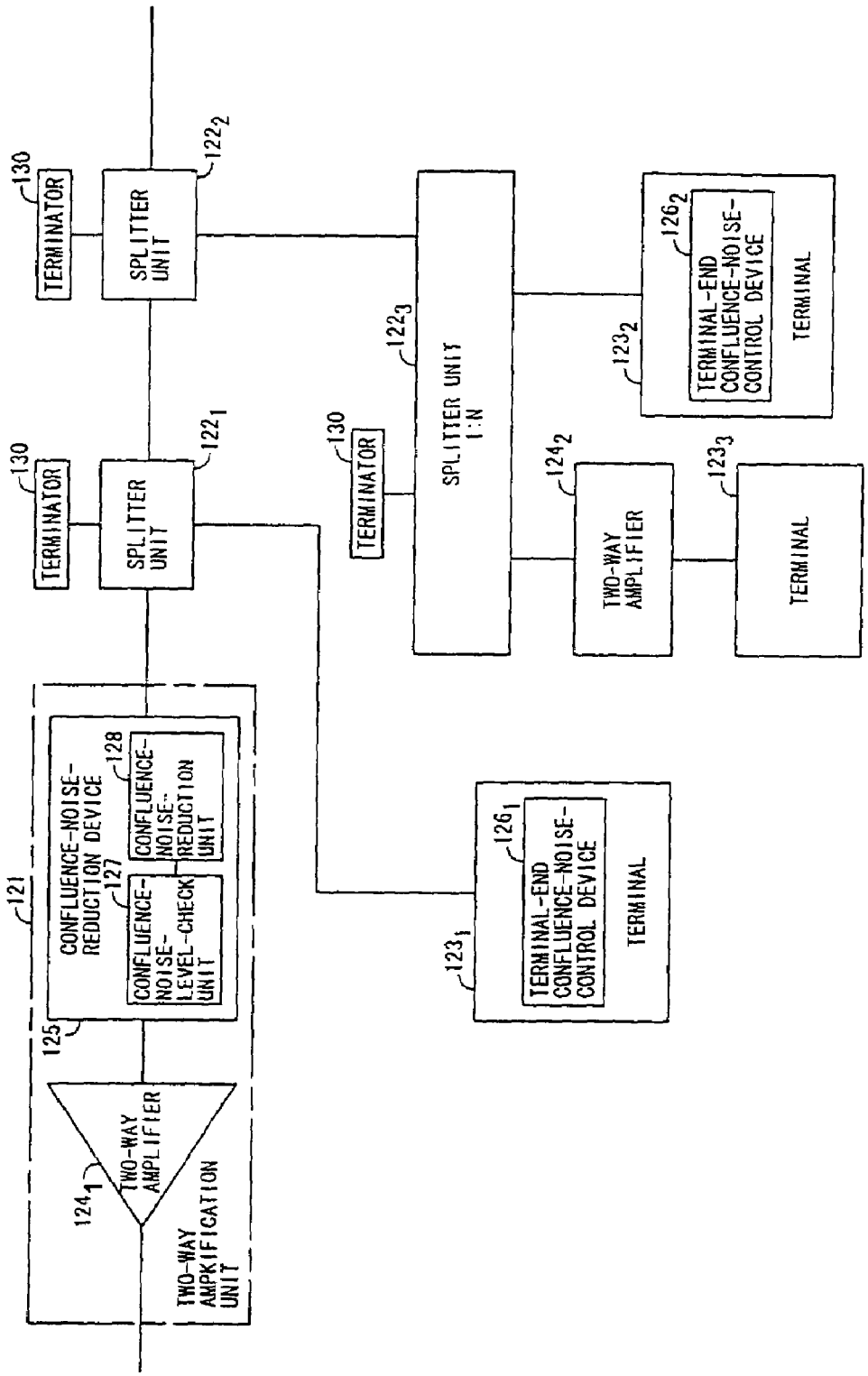
FIG. 12 is an illustrative drawing of a confluence-noise-reduction system according to another embodiment of the present invention.

FIG. 12 is an illustrative drawing of a confluence-noise-reduction system according to another embodiment of the present invention.

FIG. 12 shows a two-way amplification unit 121, splitter units $122_1$ through $122_3$, terminals $123_1$ through $123_3$, two-way amplifiers $124_1$ and $124_2$, a confluence-noise-reduction device 125, terminal-end confluence-noise-control devices $126_1$ and $126_2$, a confluence-noise-level-check unit 127, a confluence-noise-reduction unit 128, and a terminator 130.

The system of this embodiment may be typically used within one building or within a complex of house units. The two-way amplification unit 121 is provided indoor, and the terminator 130 is connected to an open-end node of the splitter units $122_1$ through $122_3$. The splitter unit $122_3$ splits signals at a power ratio of 1 to N.

In this configuration, let us denote splitting losses at the splitter units $122_1$, $122_2$, and $122_3$ as x dB, y dB, and z dB, respectively, Further, attenuation of the confluence-noise-reduction unit 128 is assumed to be 15 dB. In such a case, a gain increase of a variable amplifier provided in the terminal-end confluence-noise-control device $126_1$ of the terminal $123_1$ is set to (15+x) dB. A gain increase of a variable amplifier provided in the terminal-end confluence-noise-control device $126_2$ of the terminal $123_2$ is set to (15+x+y+z) dB.

An upward signal transmitted from the terminal-end confluence-noise-control device $126_1$ is amplified by (15+x) dB. This upward signal is attenuated in the splitter unit $122_1$ by x dB, and is further attenuated in the confluence-noise-reduction unit 128 by 15 dB before being supplied to the center. An upward signal transmitted from the terminal-end confluence-noise-control device $126_2$ is amplified by (15+x+y+z) dB. This upward signal is attenuated in the splitter units $122_3$, $122_2$, and $122_1$ by z dB, y dB, and x dB, respectively, and is further attenuated in the confluence-noise-reduction unit 128 by 15 dB before being supplied to the center.

In this manner, these upward signals are supplied from the two-way amplifier $124_1$ to the center as signals having a predetermined signal level. Because of the attenuation by 15 dB, noises that are not amplified at noise sources are attenuated by 15 dB. The present invention thus can avoid a reduction of the C/N ratio in cases such as when confluence noise is increased by an open end of a transmission line.

In a configuration where the main-transmission line is connected to a splitter via an outdoor two-way amplification unit, an attenuation by 10 dB may be provided in the confluence-noise-reduction device provided in the two-way amplification unit. In this case, a gain increase may be set to (10+α) dB where α dB is a transmission loss.

Figure 13:
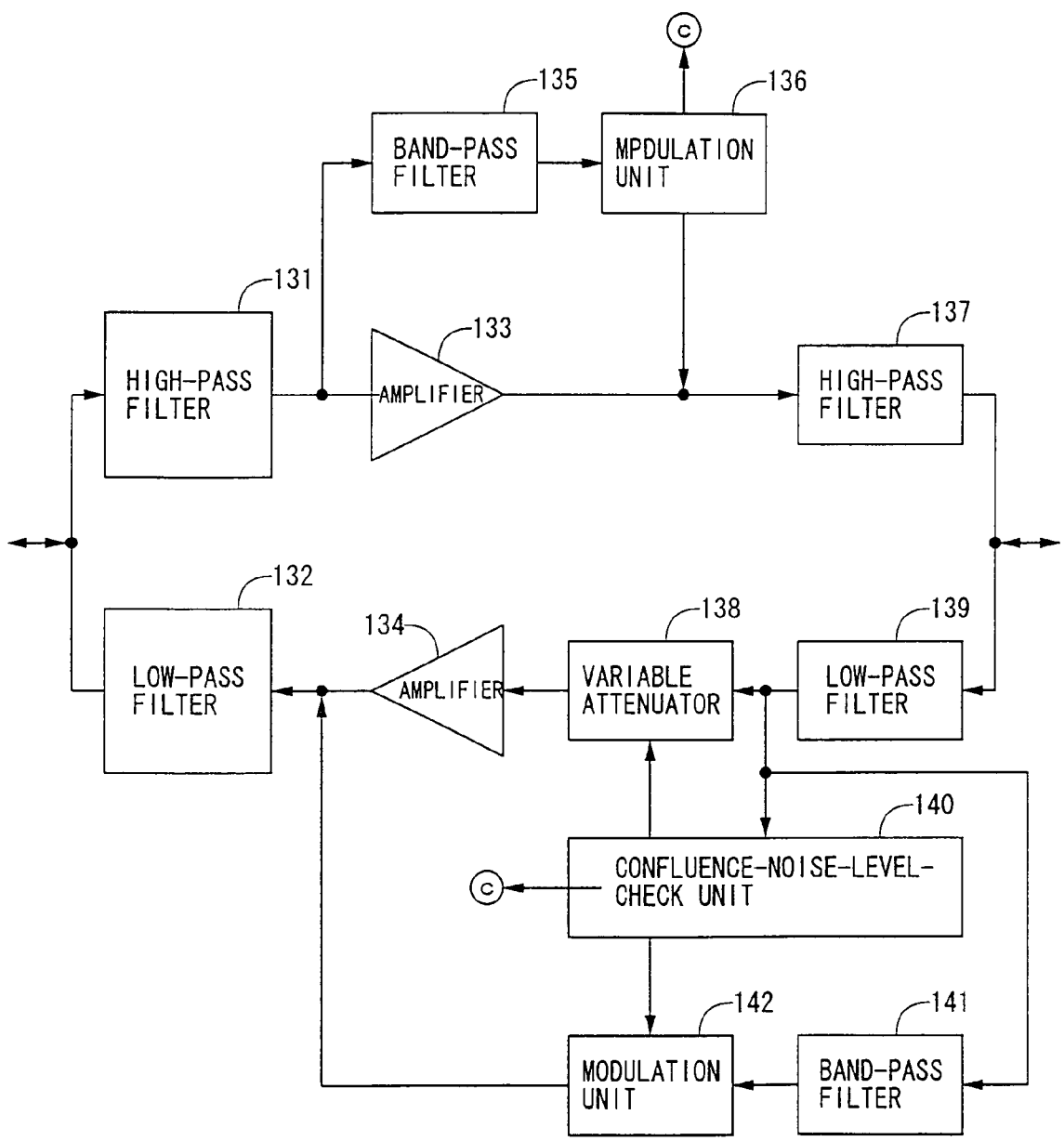
FIG. 13 is a block diagram of a noise-source searching unit according to the present invention.
Figure 14:
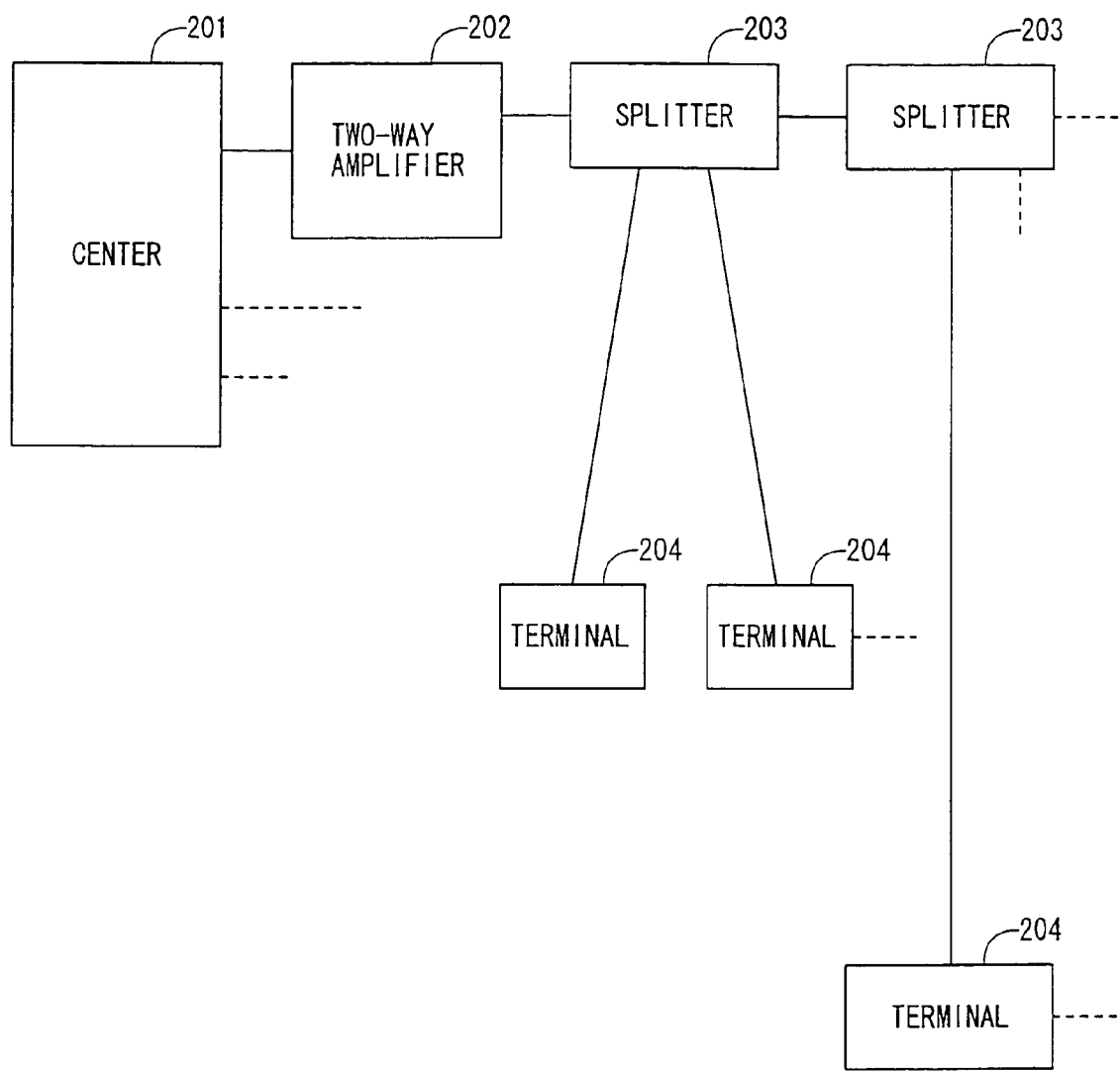
FIG. 14 is an illustrative drawing showing a related-art CATV system.

FIG. 13 is a block diagram of a noise-source searching unit according to the present invention.

The noise-source searching unit of FIG. 13 includes a high-pass filter 131, a low-pass filter 132, an amplifier 133, an amplifier 134, a band-pass filter 135, a modulation unit 136, a high-pass filter 137, a variable attenuator 138, a low-pass filter 139, a confluence-noise-level-check unit 140, a band-pass filter 141, and a modulation unit 142. The high-pass filters 131 and 137 receive downward signals passing therethrough. The low-pass filters 132 and 139 receive upward signals passing therethrough. The band-pass filters 135 and 141 extract pilot signals.

In this configuration, a tone signal indicative of an increase in confluence noise is transmitted via upward signals to the center by using a pilot signal of the upward signals in addition to the configuration of FIG. 2 where the tone signal is transmitted via downward signals to the terminals.

When the confluence-noise-level-check unit 140 detects an increase in confluence noise, the band-pass filter 135 extracts a pilot signal from a downward signal, and the modulation unit 136 inserts the pilot signal into a downward signal after modulating the pilot signal by the tone signal. At the same time, the band-pass filter 141 extracts a pilot signal from an upward signal, and the modulation unit 142 inserts the pilot signal into an upward signal after modulating the pilot signal by the tone signal.

In this manner, tone signals are sent to the center as well as to the terminals when there is an increase in confluence noise, so that search of a noise source becomes possible by identifying the source of the tone signal. Modulation frequencies and patterns of the tone signal can carry positional information about the position where the increase in confluence noise was found. Further, information about a noise level can also be included in the tone signal.

Namely, a received tone signal is subjected to an identification process as part of the search of a cause of a confluence-noise increase, and positional information is extracted to identify a position from which the tone signal is transmitted in response to the increase in confluence noise. Further, information about the noise level is also obtained from the tone signal so as to help to analyze an effect of the noise on the system.

As described above, the present invention attenuates the upward signals by an amount that compensates for a gain increase of the upward signals. Noises from noise sources are attenuated without being amplified, thereby resulting in the prevention of C/N degradation. It is conceivable to cut off the upward signals in response to the detection of an increase in confluence noise. The upward signals observed at splitters or two-way amplifiers, however, are a mixture of upward signals coming from various terminals, so that cutting off of such upward signals means less services to the terminals. The present invention can prevent confluence noises from degrading a C/N ratio without cutting off the upward signals, thereby providing better services in two-way CATV system.

Further, the tone signal may be configured to include positional information, noise-level information, etc., when the tone signal is transmitted in response to an increase of confluence noise. In such a case, identifying the tone signal can help to search for a cause of the noise increase. This makes it easier to maintain and operate a two-way CATV system.

Further, the present invention is not limited to these embodiments, but various variations and modifications may be made without departing from the scope of the present invention.

The present application is based on Japanese priority application No. 11-159439 filed on Jun. 7, 1999, with the Japanese Patent Office, the entire contents of which are hereby incorporated by reference.

What is claimed is:

1. A system for reducing noise in a signal line, through which upward signals and downward signals are transmitted between a center and terminals, comprising:
    a noise-reduction device, provided between the center and the terminals, which detects a noise increase regarding the upward signals on the signal line spontaneously without a noise measurement command from the center to generate a control signal indicative of the noise increase, and is directly triggered by said control signal to insert a tone signal into the downward signals and to attenuate the upward signals by an increased amount without transmitting the control signal to the center; and
    a noise control device, provided at the terminals, which responds to the tone signal sent from the noise-reduction device by boosting a transmission level of the upward signals by an amount compensating for the attenuation of the upward signals by said noise-reduction device.

2. The system as claimed in claim 1, wherein said noise-reduction device includes:
    a noise-level-check unit which makes a comparison between a signal component and a noise component that are obtained from the signal line, and detects a noise increase based on the comparison; and
    a noise-reduction unit which includes an attenuator that attenuates the upward signals by the increased amount if said noise-level-check unit detects the noise increase, and which transmits a tone signal via the downward signals if said noise-level-check unit detects the noise increase.

3. The system as claimed in claim 2, wherein said noise-control device includes:
    a tone-detection unit which detects the tone signal; and
    a variable amplifier which boosts amplification of the upward signals by an amount compensating for the attenuation of the upward signals by said attenuator.

4. The system as claimed in claim 1, wherein one or more noise-reduction devices including said noise-reduction device are provided in one or more of a two-way-amplification unit and splitter units provided between the center and the terminals.

5. The system as claimed in claim 4, wherein said noise-control device boosts the transmission level of the upward signals by an amount compensating for a total attenuation of the upward signals by all of said one or more noise-reduction devices.

6. The system as claimed in claim 1, wherein said noise-reduction device includes:
    a unit which obtains a level of a signal component demodulated through coherent detection of the upward signals;
    a unit which obtains a level of a noise component demodulated through detection of noises observed on the signal line during a time period when no signal component is present; and
    a check unit which makes a comparison between the level of the signal component and the level of the noise component, and detects a noise increase based on the comparison.

7. The system as claimed in claim 1, wherein said noise-reduction device includes:
    a unit which obtains a level of a signal component demodulated through coherent detection of the upward signals;
    a unit which obtains a level of a signal and noise components demodulated through detection of a high-frequency signal included within a frequency range of the upward signals;
    a subtraction unit which obtains a noise level as a difference between the level of the signal component and the level of the signal and noise components; and
    a check unit which compares the noise level with one of a reference level and the level of the signal component, and detects a noise increase based on the comparison.

* * * * *